US011505026B2

(12) United States Patent
Di Tanna et al.

(10) Patent No.: US 11,505,026 B2
(45) Date of Patent: Nov. 22, 2022

(54) SUSPENSION ASSEMBLY FOR A TILTING VEHICLE, FORECARRIAGE AND TILTING VEHICLE

(71) Applicant: PIAGGIO & C. S.P.A., Pisa (IT)

(72) Inventors: Onorino Di Tanna, Pisa (IT); Stefano Bartolozzi, Pisa (IT); Mario Donato Santucci, Pisa (IT)

(73) Assignee: PIAGGIO & C. S.P.A., Pisa (IT)

( * ) Notice: Subject to any disclaimer, the term of this patent is extended or adjusted under 35 U.S.C. 154(b) by 894 days.

(21) Appl. No.: 16/337,465

(22) PCT Filed: Sep. 27, 2017

(86) PCT No.: PCT/IB2017/055882
§ 371 (c)(1),
(2) Date: Mar. 28, 2019

(87) PCT Pub. No.: WO2018/060869
PCT Pub. Date: Apr. 5, 2018

(65) Prior Publication Data
US 2019/0232749 A1 Aug. 1, 2019

(30) Foreign Application Priority Data
Sep. 28, 2016 (IT) .................. 102016000097100

(51) Int. Cl.
*B60G 21/00* (2006.01)
*B60G 3/20* (2006.01)
(Continued)

(52) U.S. Cl.
CPC ............. *B60G 21/007* (2013.01); *B60G 3/20* (2013.01); *B60G 13/003* (2013.01);
(Continued)

(58) Field of Classification Search
CPC .............. B60G 2300/45; B60G 13/005; B60G 21/007; B60G 2200/144; B60G 3/20; B62K 5/10; B62D 9/02
(Continued)

(56) References Cited

U.S. PATENT DOCUMENTS

| 4,546,997 A | 10/1985 | Smyers |
| 4,662,467 A * | 5/1987 | Arai .......................... B60G 3/24 280/282 |

(Continued)

FOREIGN PATENT DOCUMENTS

| CN | 1898122 A | 1/2007 |
| CN | 101074037 A | 11/2007 |

(Continued)

OTHER PUBLICATIONS

Indian Search Report for corresponding application 201927008535; dated Feb. 24, 2021.
(Continued)

*Primary Examiner* — Paul N Dickson
*Assistant Examiner* — Caitlin Anne Miller
(74) *Attorney, Agent, or Firm* — Cantor Colburn LLP

(57) ABSTRACT

Suspension assembly including a body associable to the chassis of the tilting vehicle and two junction devices opposite with respect to the body; the junction devices being articulated to the body by means of connecting elements, wherein each junction device includes a first structural junction portion rotationally coupled in a first coupling site to a first connecting element and a second structural joint portion rotationally coupled in a second coupling site to a second connecting element; and wherein the suspension assembly further includes elasto-damping elements associated with the hinge devices and adapted to damp the stresses transmitted by the wheels; and wherein each hinge device
(Continued)

includes a dynamic junction portion rotationally coupled to a elasto-damping element in a dynamic junction coupling site; and wherein the junction device rigidly determines the relative positioning and spatial orientation of the first structural joint portion, the second structural joint portion and the dynamic joint portion; ; the suspension assembly further having a rocker arm element associated in a titling manner to the body and to the elasto-damping elements.

10 Claims, 9 Drawing Sheets

(51) Int. Cl.
*B62D 9/02* (2006.01)
*B62K 5/027* (2013.01)
*B62K 5/05* (2013.01)
*B62K 5/08* (2006.01)
*B62K 5/10* (2013.01)
*B60G 13/00* (2006.01)

(52) U.S. Cl.
CPC ............ *B60G 13/005* (2013.01); *B62D 9/02* (2013.01); *B62K 5/027* (2013.01); *B62K 5/05* (2013.01); *B62K 5/08* (2013.01); *B62K 5/10* (2013.01); *B60G 2200/144* (2013.01); *B60G 2200/17* (2013.01); *B60G 2200/46* (2013.01); *B60G 2204/128* (2013.01); *B60G 2204/129* (2013.01); *B60G 2204/421* (2013.01); *B60G 2300/122* (2013.01); *B60G 2300/124* (2013.01); *B60Y 2200/122* (2013.01); *B60Y 2200/124* (2013.01)

(58) Field of Classification Search
USPC .................................................. 280/124.103
See application file for complete search history.

(56) References Cited

U.S. PATENT DOCUMENTS

| | | | | |
|---|---|---|---|---|
| 6,763,905 B2* | 7/2004 | Cocco | ...................... | B62K 5/10 180/210 |
| 7,487,985 B1* | 2/2009 | Mighell | ................. | B62K 5/027 280/124.126 |
| 7,562,885 B2* | 7/2009 | Marcacci | ................. | B62K 5/05 280/124.135 |
| 7,607,695 B2* | 10/2009 | Moulene | .................. | B62K 5/01 280/775 |
| 8,020,878 B2* | 9/2011 | Hara | ........................ | B62K 5/10 280/5.509 |
| 8,249,775 B2* | 8/2012 | Van Den Brink | ....... | B62D 9/02 280/5.509 |
| 8,662,510 B2* | 3/2014 | Christensen | ........... | B60G 11/28 280/124.135 |
| 8,967,318 B2* | 3/2015 | Kuwabara | .............. | B60G 7/008 280/124.1 |
| 9,199,686 B2* | 12/2015 | Aillet | ....................... | B62K 5/01 |
| 9,475,535 B2* | 10/2016 | Iizuka | ...................... | B62K 5/10 |
| 9,676,438 B2* | 6/2017 | Kokes | ..................... | B62K 13/04 |
| 9,994,277 B2* | 6/2018 | Malphettes | .............. | B60G 3/20 |
| 10,501,119 B2* | 12/2019 | Doerksen | ............. | B60G 17/018 |
| 2007/0278023 A1 | 12/2007 | Masut | | |
| 2008/0012262 A1* | 1/2008 | Carabelli | ................. | B62D 9/02 280/124.106 |
| 2012/0098220 A1 | 4/2012 | Yu | | |
| 2014/0346753 A1 | 11/2014 | Huang | | |
| 2015/0183484 A1 | 7/2015 | Aillet | | |

FOREIGN PATENT DOCUMENTS

| | | |
|---|---|---|
| CN | 101092105 A | 12/2007 |
| CN | 101100162 A | 1/2008 |
| CN | 101203414 A | 6/2008 |
| CN | 100480125 C | 4/2009 |
| CN | 201338661 Y | 11/2009 |
| CN | 102186685 A | 9/2011 |
| CN | 102785735 A | 11/2012 |
| CN | 103192916 A | 7/2013 |
| CN | 104520178 A | 4/2015 |
| EP | 1864843 A2 | 12/2007 |
| FR | 2872773 A1 | 1/2006 |
| FR | 2993207 A1 | 1/2014 |
| JP | 61146692 A | 7/1986 |
| JP | 2002160687 A | 6/2002 |
| JP | 2007514594 A | 6/2007 |
| JP | 2008505797 A | 2/2008 |
| JP | 2010052666 A | 3/2010 |
| JP | 2010221864 A | 10/2010 |
| JP | 2012171530 A * | 9/2012 |
| JP | 2012171530 A | 9/2012 |
| JP | 2013022993 A | 2/2013 |
| TW | M516519 | 2/2016 |
| WO | 0192084 A1 | 12/2001 |
| WO | 2005058680 A1 | 6/2005 |
| WO | 2007133650 A2 | 11/2007 |
| WO | 2015122940 A1 | 8/2015 |

OTHER PUBLICATIONS

International Search Report for corresponding application PCT/IB2017/055882 filed on Sep. 27, 2017; dated Nov. 15, 2017.
Written Opinion for corresponding application PCT/IB2017/055882 filed on Sep. 27, 2017; dated Nov. 15, 2017.
Chinese Office Action for corresponding application 201780057735X; dated Mar. 25, 2020.
Tiawanese Search Report for corresponding application 106133110; dated Sep. 10, 2020.

* cited by examiner

SUSPENSION ASSEMBLY FOR A TILTING VEHICLE, FORECARRIAGE AND TILTING VEHICLE

FIELD OF THE INVENTION

The object of the present invention is a suspension assembly.

More particularly, the present invention relates to a suspension assembly for a tilting vehicle comprising at least two wheels facing each other.

Likewise, the present invention relates to a forecarriage for a tilting vehicle comprising said suspension assembly as well as to a rear axle for a tilting vehicle comprising said suspension assembly and to a tilting vehicle comprising said suspension assembly.

In addition, the present invention relates to a tilting vehicle comprising said forecarriage, and one or more rear drive wheels.

STATE OF THE ART

Tilting vehicles comprising two front steering wheels and one or more rear drive wheels suitable to combine the maneuverability of a motorcycle or scooter with the safety and road holding ability of an automobile are generally known. Such vehicles are able to tilt, in other words roll, in curves to balance the effect of the centrifugal force. It is therefore necessary that the suspension system provided on such vehicles be sufficiently rigid to keep the wheels in contact with the road surface during the roll and at the same time suitable for damping the vibrations induced by the wheels on the suspended masses such as the chassis.

For example, FR-2993207 shows a solution for a suspension system for independent wheels of a forecarriage of a three-wheeled tilting vehicle comprising a single elastic element oriented horizontally and connected to each wheel by means of dynamic dampers consisting of an oil-filled container wherein masses are provided that are free to vibrate to damp the amplitude of the vibrations transmitted from the wheels to the chassis. Although having the ability to tune the dynamic damping frequency to the resonance of the wheels by varying the vibrating mass of the damper, such suspension architecture has many drawbacks as the effectiveness of this system is limited to particular conditions of use; for example, such a system is unsuitable to handle roads with fast and intense bumps, due to the limited size that such dynamic dampers can realistically be. Consequently, such solution presents insufficient comfort for the driver, which, coupled with an ineffective attenuation of the stresses caused by the bumps on the road surface, results in poor handling of the vehicle, during both urban and extra-urban trips.

For example, EP-1694555, in the name of the same Applicant, shows a tilting vehicle with two front steering wheels comprising an independent wheel suspension system based on a pair of deformable articulated quadrilateral kinematic mechanisms, wherein two elasto-damper elements are provided that connect each wheel to one upper cross member in turn secured to the chassis of the vehicle.

Such solution, although advantageous in many ways, is not devoid of drawbacks. In fact, the sliding directions of the elasto-damper elements coincide with the steering axle, requiring that in operating conditions, the forces applied to a wheel due to, for example, roughness of the road surface and/or impacts with obstacles, and/or braking action, are transmitted to the handlebar by generating a torque that tends to rotate the handlebar itself. In addition, the component of the forces applied to the wheels directed parallel to the vehicle's direction of travel is transmitted to the chassis of the vehicle by the rods of the elasto-damping elements, imposing high flexural stresses to the upper cross member, resulting in increased steering friction, and requiring that the upper cross member be designed sufficiently heavy and bulky to withstand them.

Moreover, in such a solution, when rolling, such as in a curve, the inclination angles of the wheels are different from each other, entailing a non-optimal utilization of the road surface adhesion. At the same time, such known solution involves, under rolling conditions, an imbalance between the wheel on the inside the curve and the wheel on the outside of the curve, which makes it impossible to handle satisfactorily the progressive stiffness of the suspension in curves and forces oscillations of the wheel which are transmitted to the suspended masses, resulting in poor driver comfort, particularly on roads with an irregular or bumpy surface.

The need for providing a solution to the aforementioned drawbacks with reference to the state of the art is therefore strongly felt.

The need to provide a suspension solution for tilting vehicles with three or more wheels that is suitable to damp the stresses transmitted by the wheels to the steering control without thereby resulting in decreased suspension stiffness or an increased footprint is strongly felt. The need is strongly felt to provide a suspension solution for a tilting vehicle with three or more wheels that makes the vehicle more maneuverable than with well-known solutions, without thereby reducing the comfort of the driver or diminishing the road holding ability.

The need is strongly felt to provide a suspension solution for a vehicle with three or more wheels that gives the vehicle an improved road holding ability, even in curves and rolling conditions, while providing effective damping action and a smaller footprint in the direction transverse to the direction of travel.

Solution

An object of the present invention is to provide a solution to the needs listed above with reference to the prior art.

This and other objects are achieved by means of a suspension assembly according to claim 1, as well as a forecarriage according to claim 9, and a tilting vehicle according to claim 10. Some advantageous embodiments are object of the dependent claims.

FIGURES

Further features and advantages of the suspension assembly, the forecarriage and the tilting vehicle according to the invention will become apparent from the following description of its preferred embodiments, given by way of non-limiting example, with reference to the appended figures wherein.

DESCRIPTION OF SOME OF THE PREFERRED EMBODIMENTS

Figure 1:
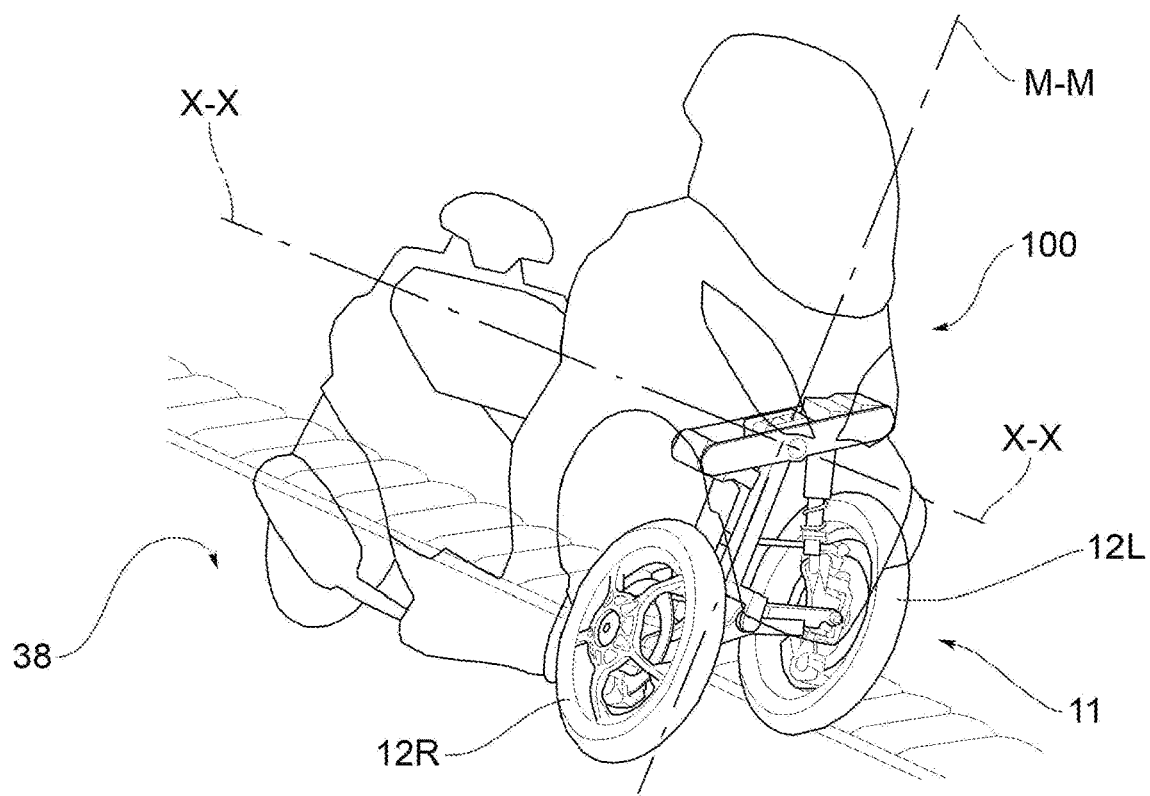
FIGS. 1 to 4 are schematic axonometric views showing a tilting vehicle comprising a suspension assembly in accordance with an embodiment wherein the tilting vehicle is in the rolling condition and advancing on a road surface with irregularities.
Figure 2:
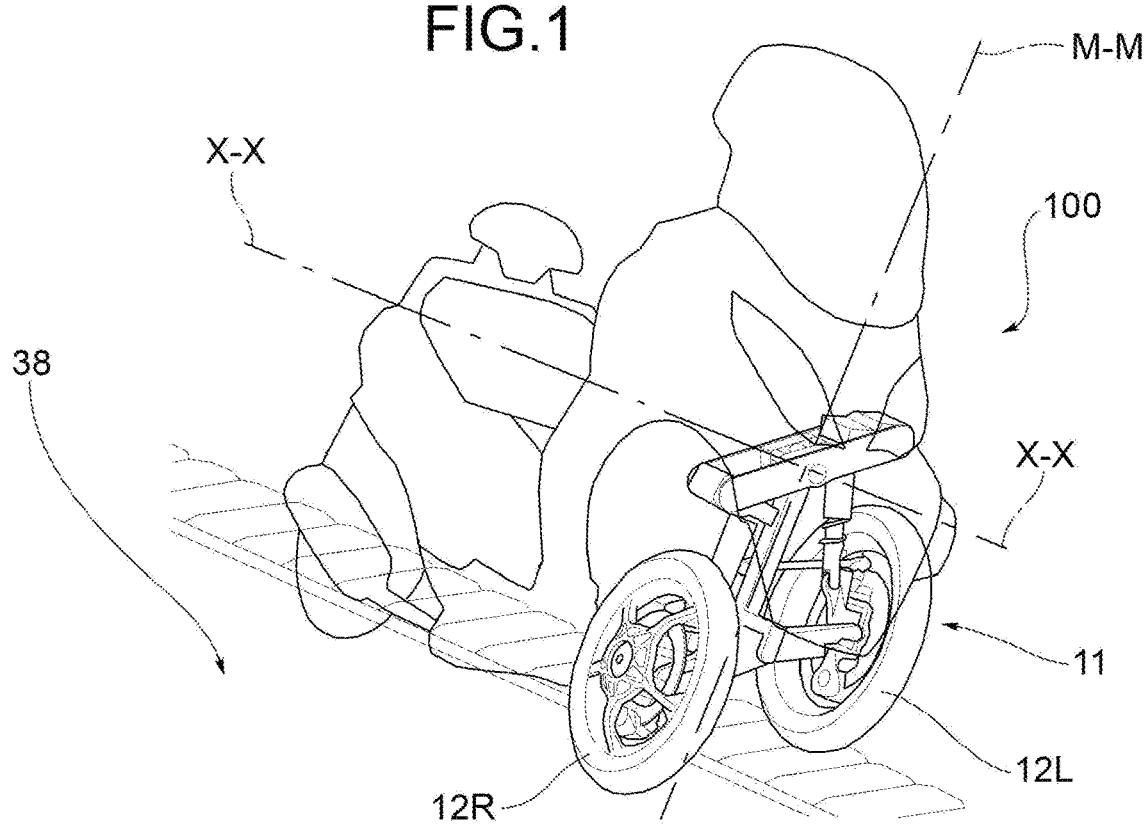
Figure 3:
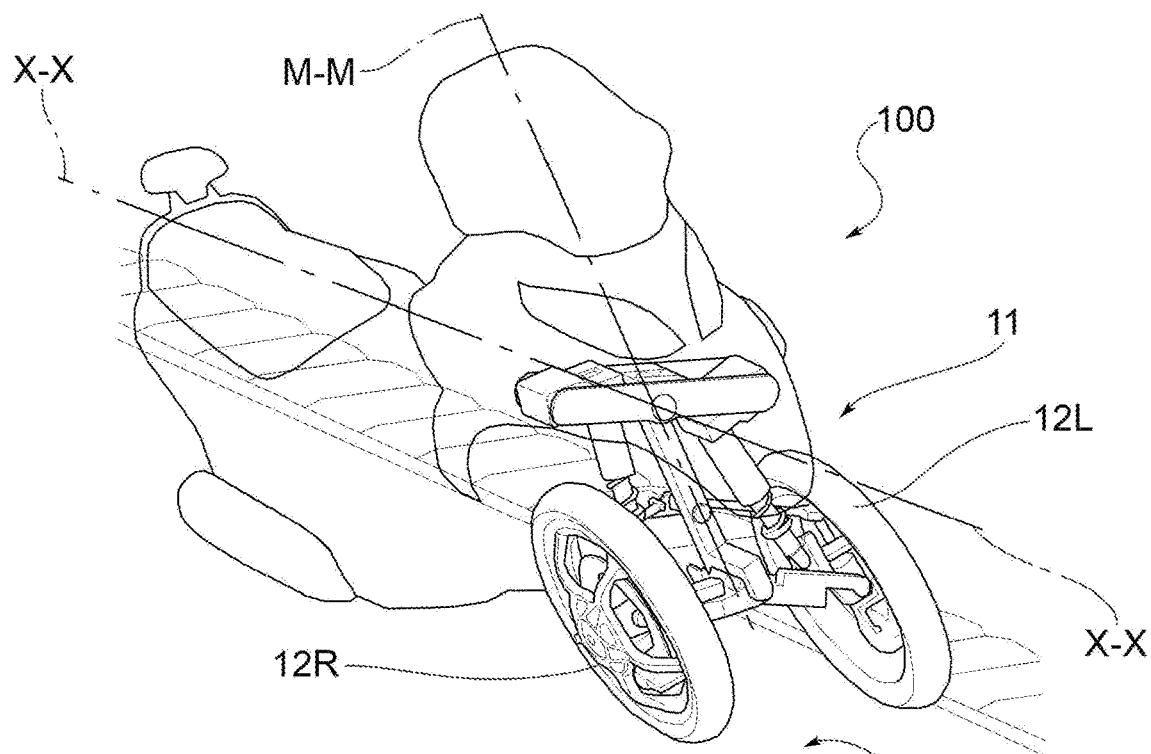
Figure 4:
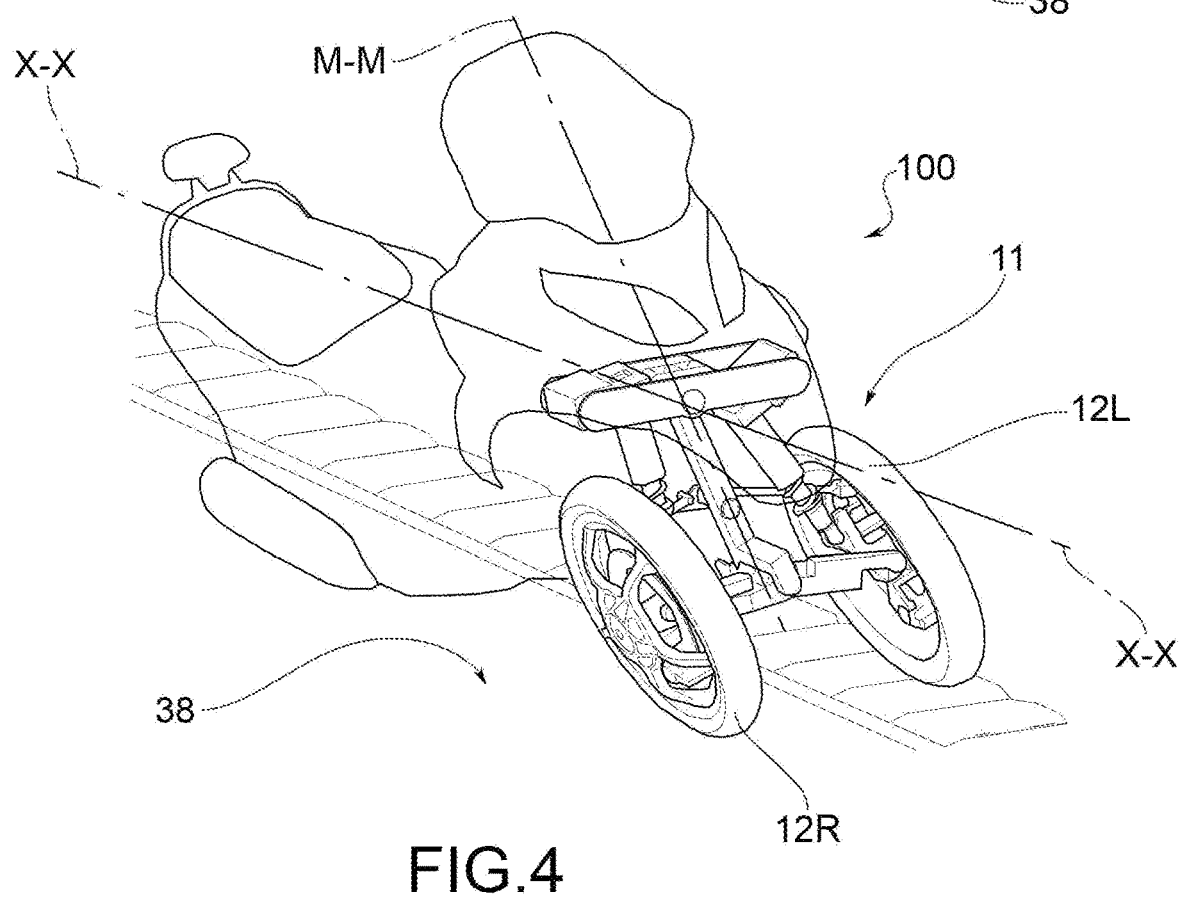
Figure 5:
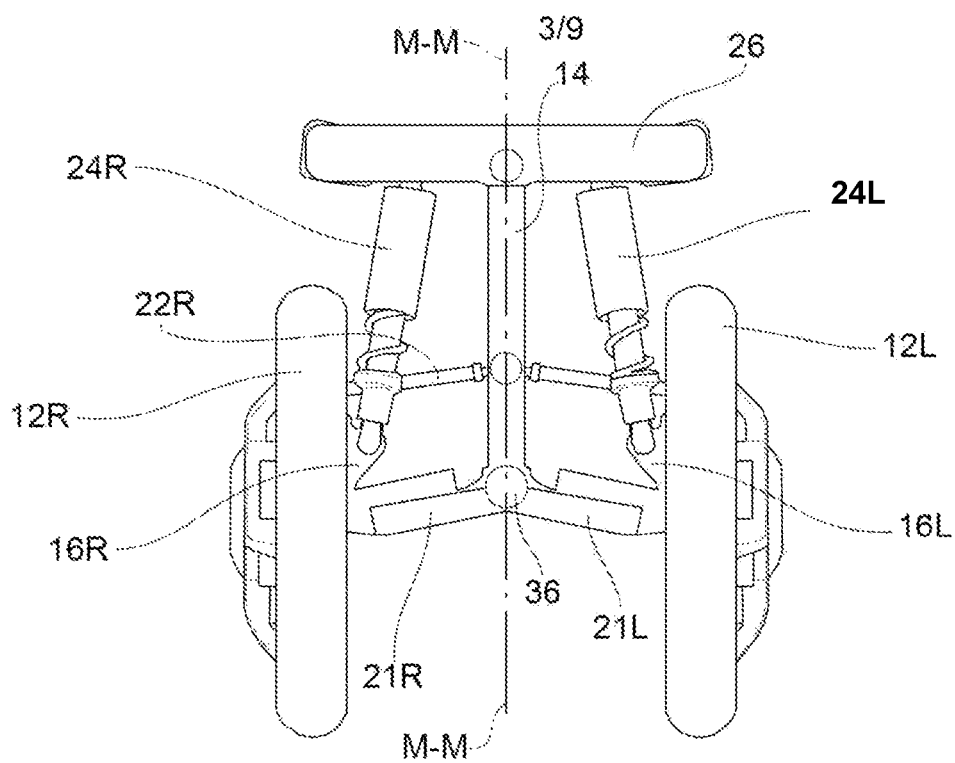
FIGS. 5 and 6 are vertical elevational views showing a suspension assembly according to one embodiment.
Figure 6:
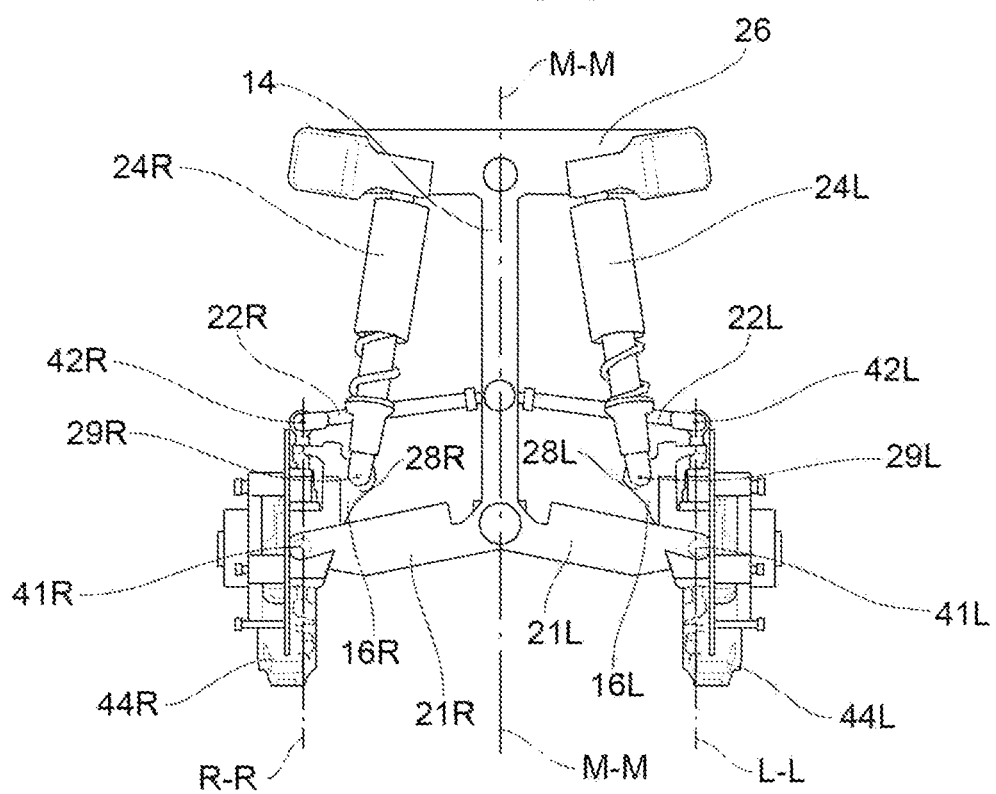
Figure 7:
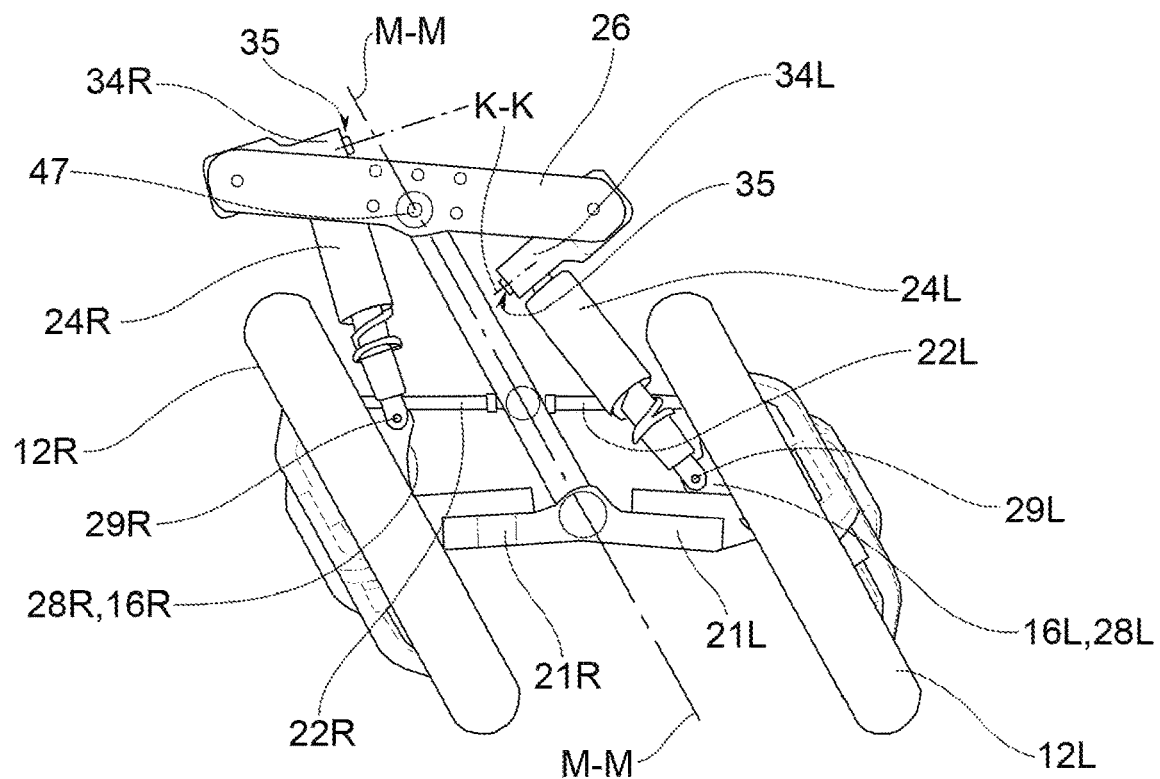
FIG. 7 is a vertical elevational view showing a forecarriage comprising a suspension assembly under rolling conditions, in accordance with one embodiment.
Figure 8:
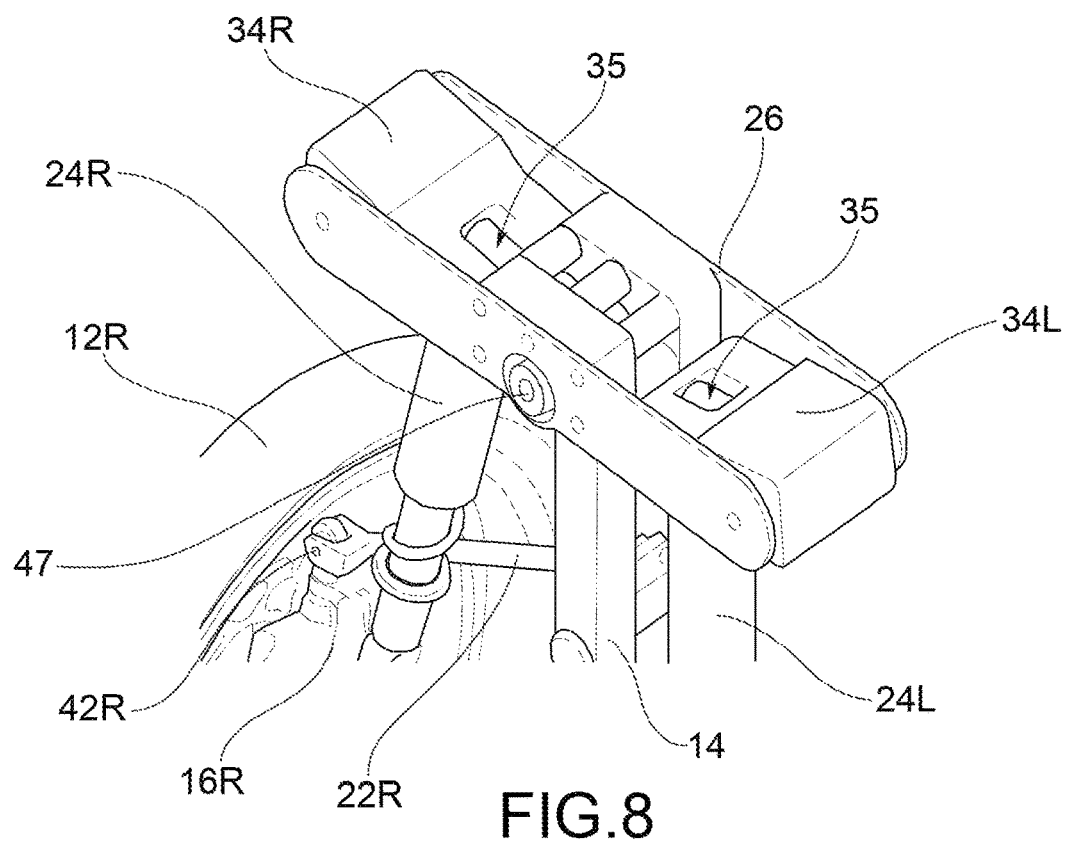
FIG. 8 is an axonometric view of a portion of a forecarriage comprising a suspension assembly.
Figure 9:
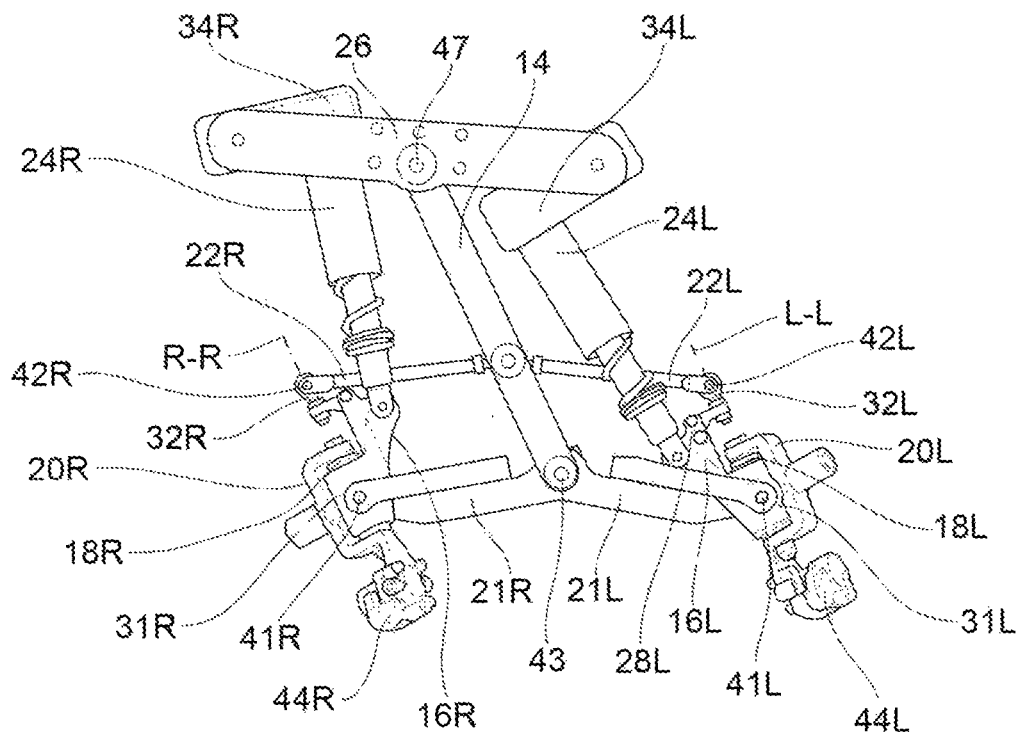
FIGS. 9 and 10 are perspective views showing a suspension assembly under rolling conditions, in accordance with one embodiment.
Figure 10:
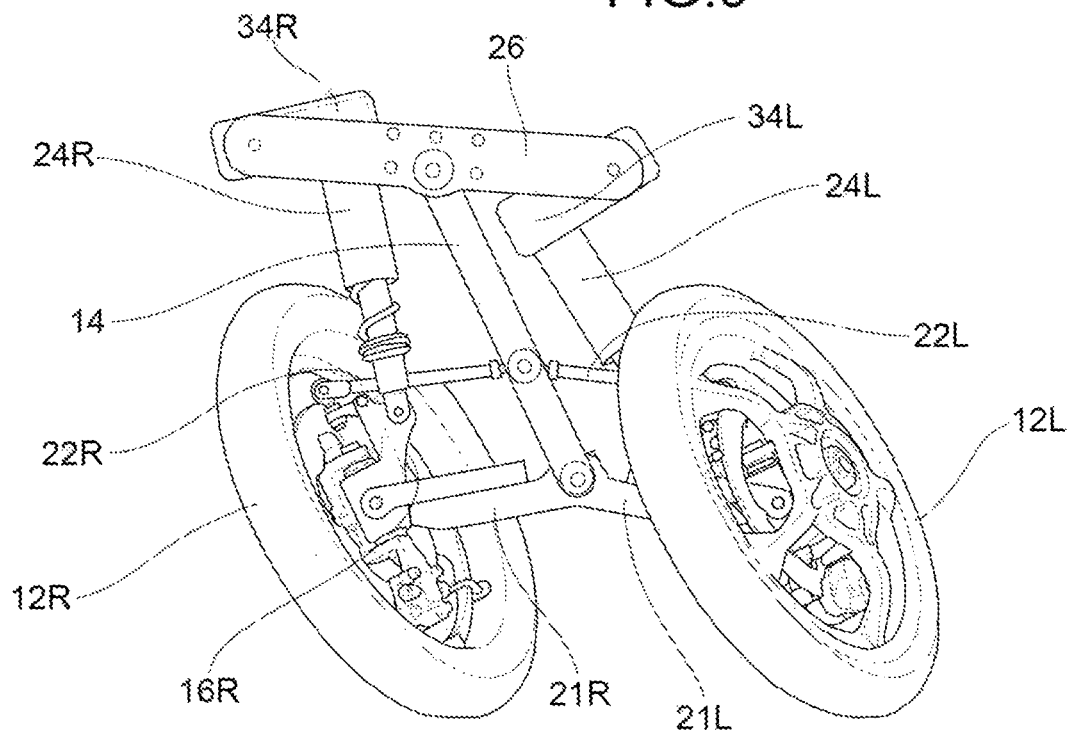
Figure 11:
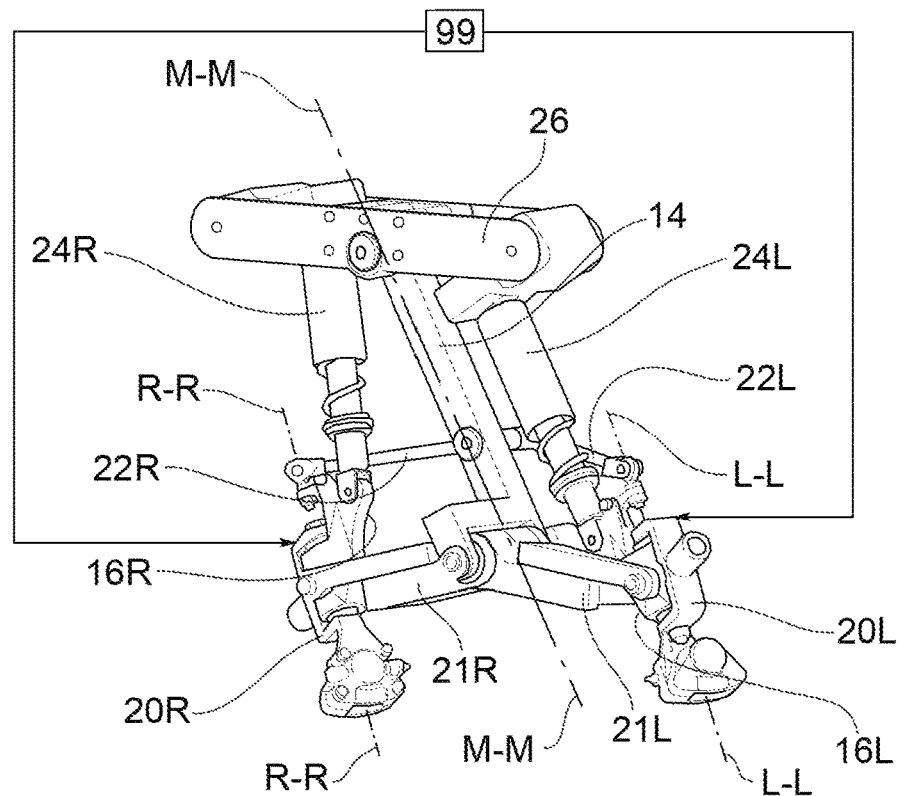
FIG. 11 is a perspective schematic view of a suspension assembly under rolling conditions and with steered wheels, in accordance with one embodiment, wherein the steering control is schematically represented.
Figure 12:
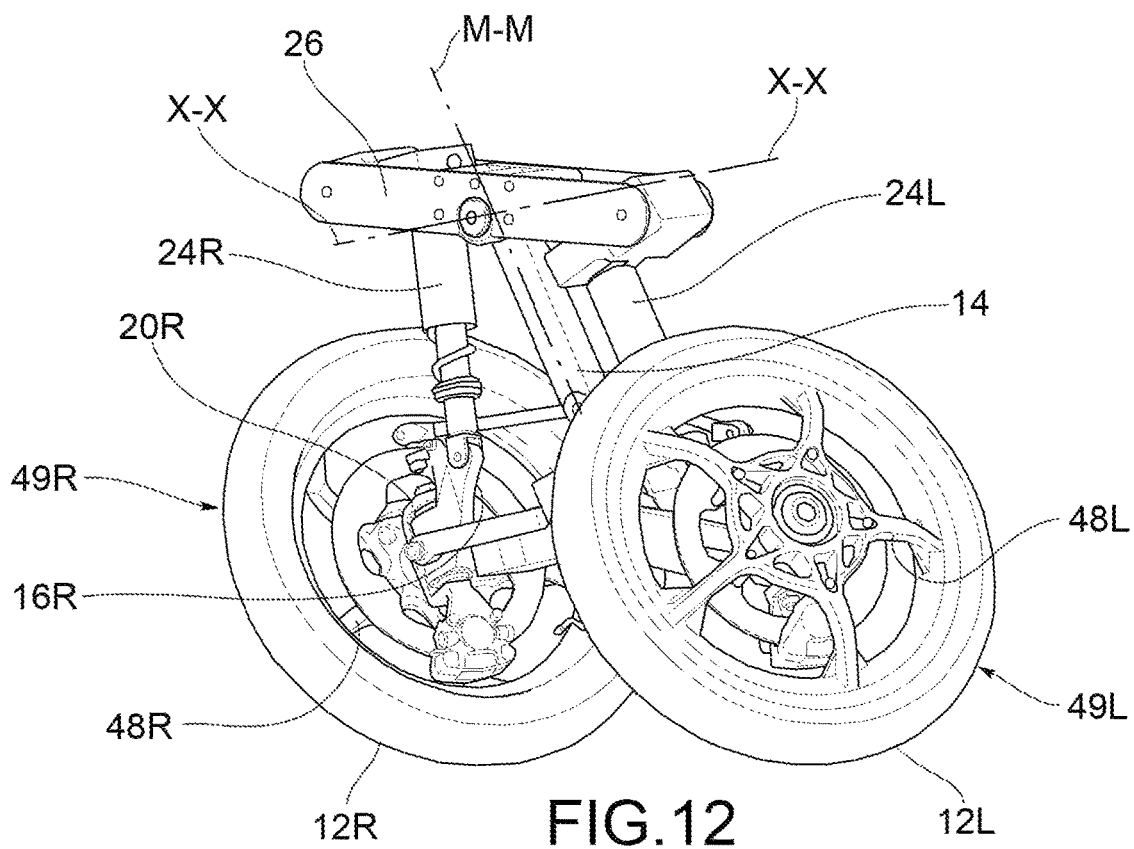
FIG. 12 is a perspective schematic view of a forecarriage in rolling conditions and with steered wheels, in accordance with one embodiment.
Figure 13:
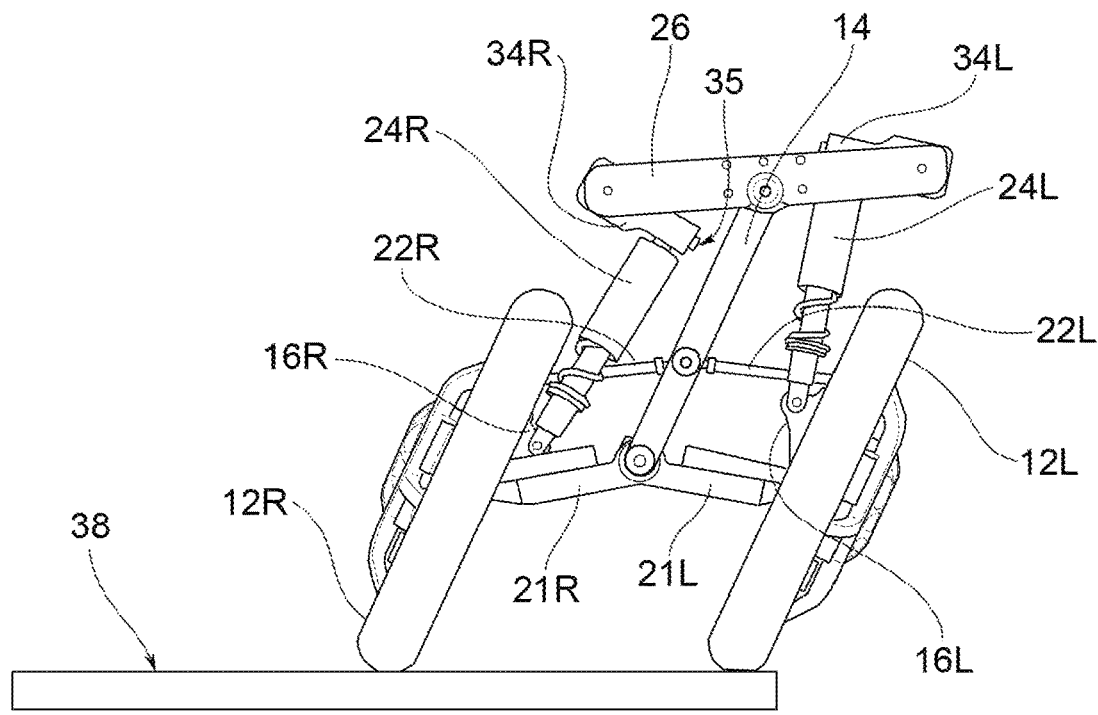
FIGS. 13 to 16 are vertical elevational views showing a suspension assembly in the rolling condition in accordance with one embodiment, when in the operating condition.
Figure 14:
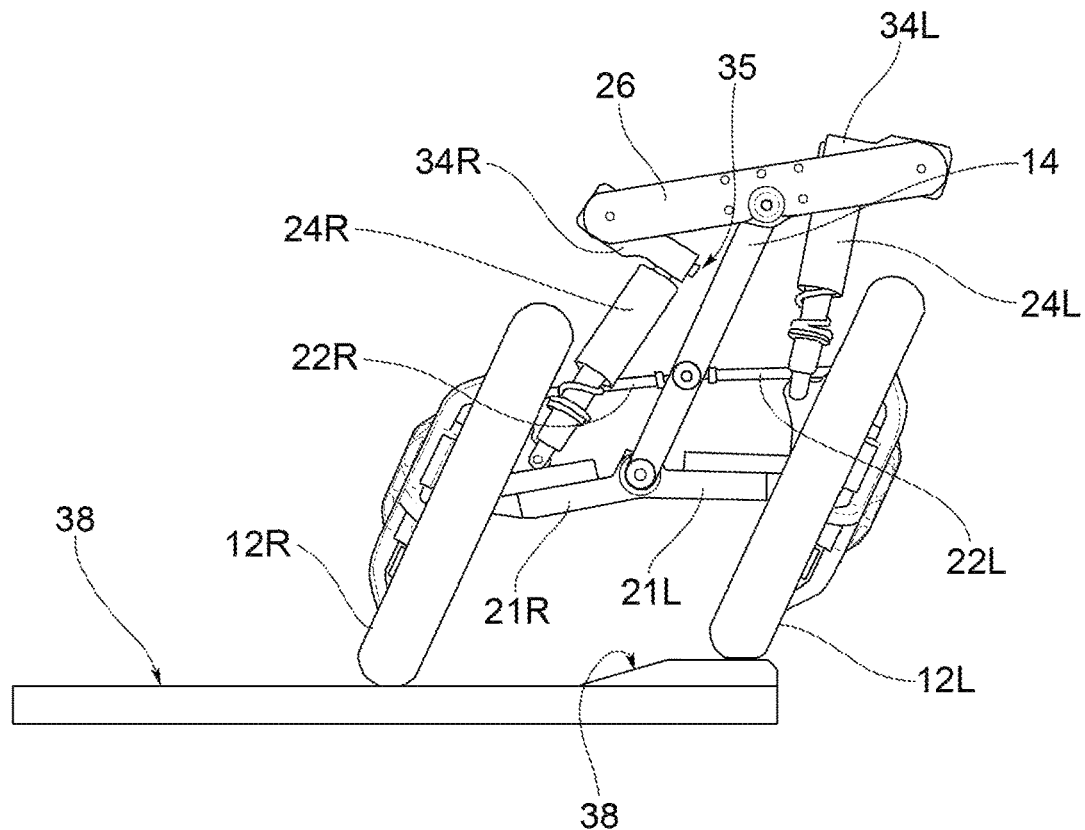
Figure 15:
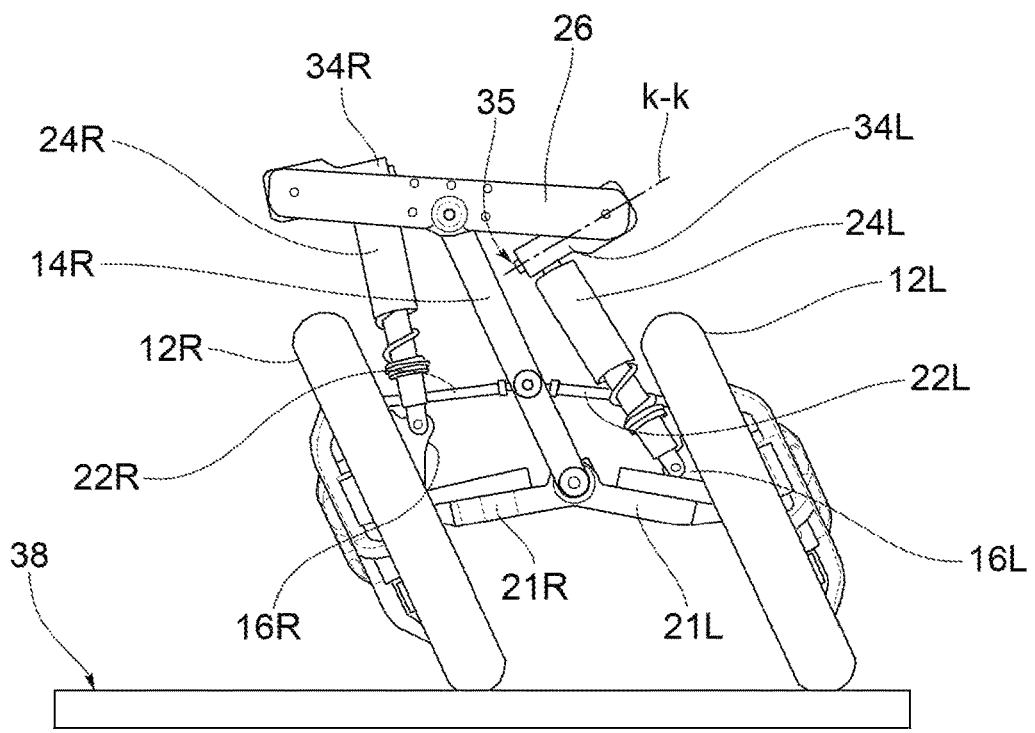
Figure 16:
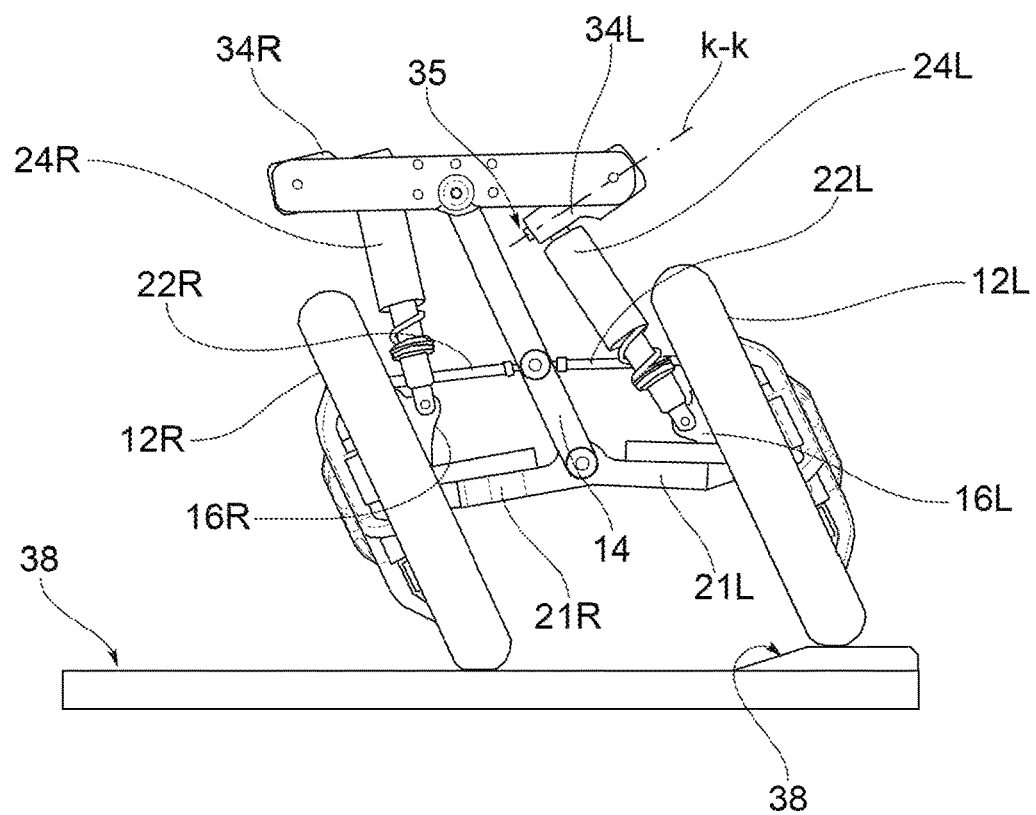
Figure 17:
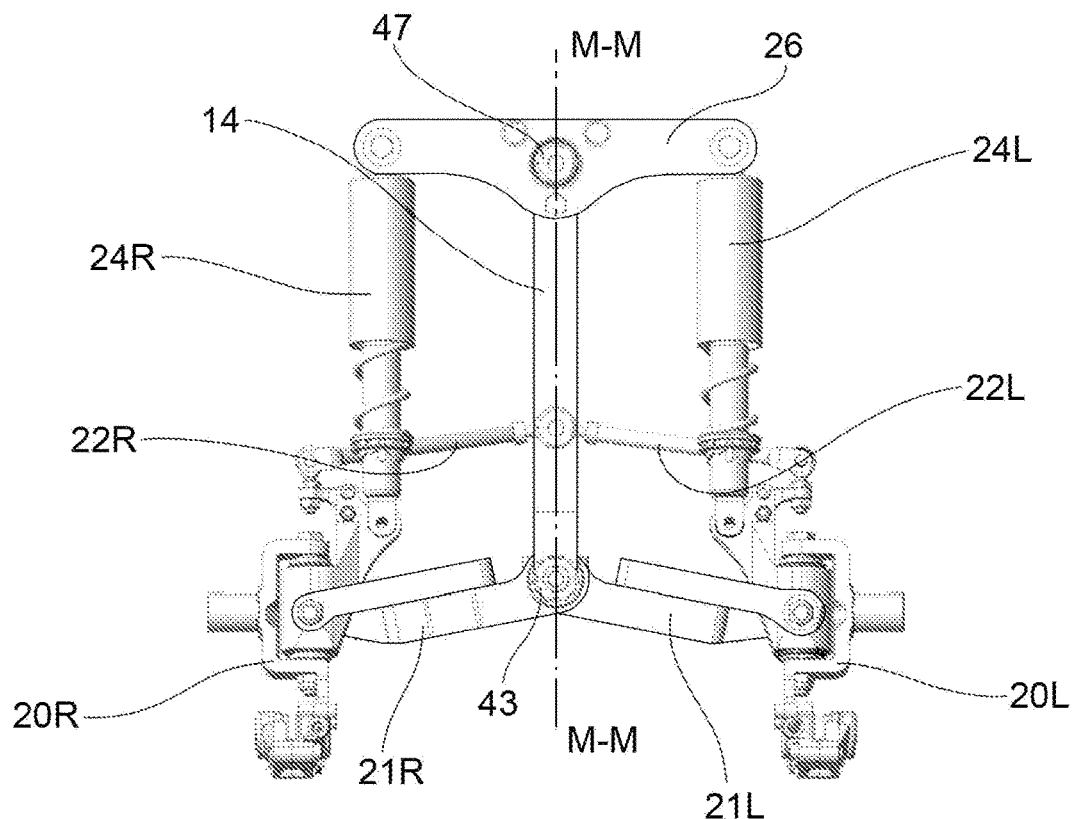
FIGS. 17 and 18 are vertical elevation views showing a suspension assembly, according to an embodiment.
Figure 18:
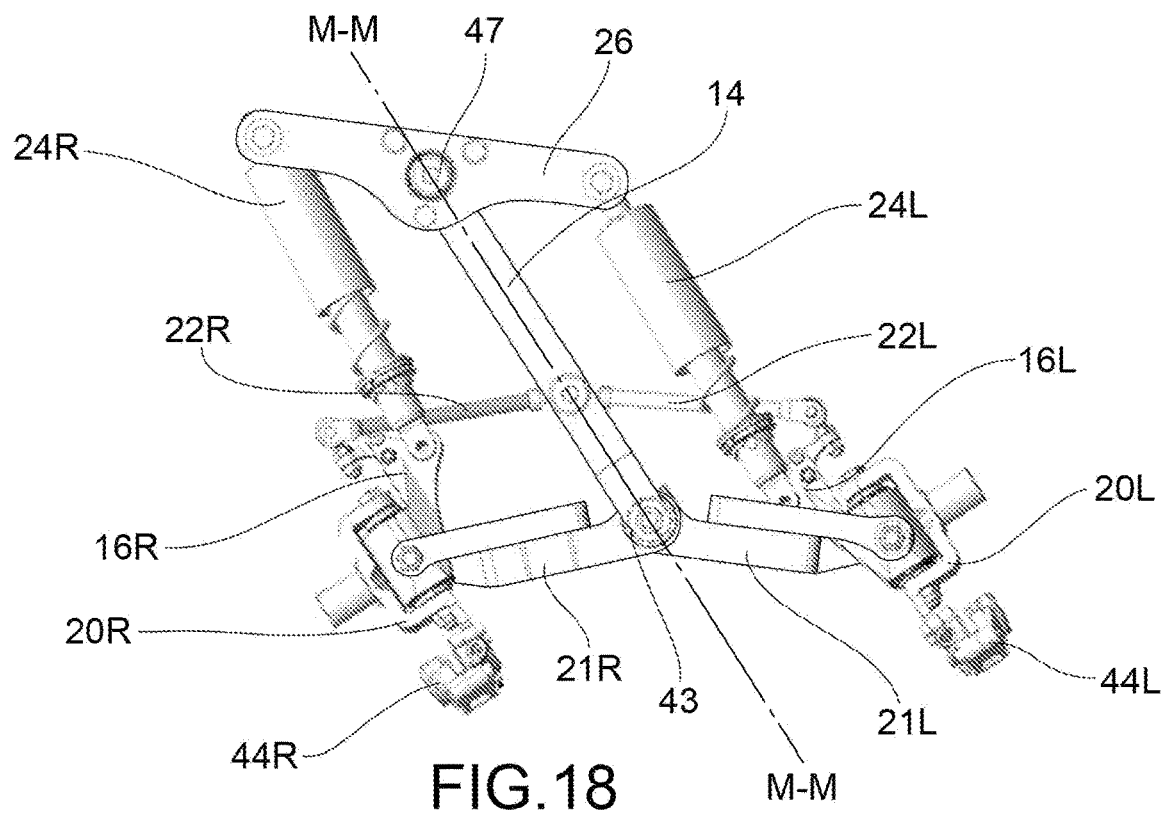

In accordance with a general embodiment, a suspension assembly for a forecarriage or rear axle is provided comprising at least two wheels 12L, 12R of a tilting vehicle 100.

The term "tilting vehicle" means a vehicle suitable for carrying out a rolling movement, for example in a curve.

In accordance with a general embodiment, a tilting vehicle 100 comprising said at least one suspension assembly is provided.

In a tilting vehicle 100, a median plane M-M, substantially parallel to the direction of travel of the vehicle X-X is defined. For the sake of clarity, in this description and in the appended claims, the components that a driver of the tilting vehicle 100 sees located to the left of the median plane M-M, or the left side of the vehicle, are indicated with the letter "L"; and the corresponding components that a driver of the tilting vehicle 100 sees located to the right of the median plane M-M, or the right side of the vehicle are indicated with the letter "R".

In accordance with a preferred embodiment, said tilting vehicle 100 is a three-wheeled vehicle having two wheels 12L, 12R facing and opposite with respect to the median plane M-M.

In accordance with a preferred embodiment, said at least two wheels 12L, 12R are front wheels. In accordance with one embodiment, said at least two wheels 12L, 12R are rear wheels. In accordance with one embodiment, said at least two wheels 12L, 12R are driven wheels. In accordance with a preferred embodiment, said at least two wheels 12L, 12R are drive wheels, preferably electrically driven. In accordance with one embodiment, said at least two wheels 12L, 12R are steering wheels.

Said suspension assembly comprises a body 14 associable to the chassis of the tilting vehicle 100. In accordance with a preferred embodiment, the median axis goes through said body 14.

Said suspension assembly comprises two junction devices 16L, 16R opposite to said body 14. Each junction device 16L, 16R is associable to a wheel 12L, 12R of the tilting vehicle 100. In accordance with one embodiment, a hub bracket 20L, 20R may be provided in one piece with said junction device 16L, 16R or may be assembled to said junction device 16L, 16R. In accordance with one embodiment, each wheel 12L, 12R is directly connected to a junction device 16L, 16R.

Said junction devices 16L, 16R are articulated to said body (12) by means of connecting elements 21L, 21R, 22L, 22R.

Each junction device 16L, 16R comprises at least one first structural joint portion 31L, 31R rotoidally coupled in a first coupling site 41L, 41R to at least one first connecting element 21L, 21L and at least one second structural joint portion 32L, 32R rotoidally coupled in a second coupling site 42L, 42R to at least one second connecting element 22L, 22R.

The term "rotoidally coupled" means a coupling type that allows the relative rotation of the coupled elements at least in a definable plane around a definable axis of motion. In accordance with one embodiment, spherical joints are provided to provide such rotoidal coupling. In accordance with one embodiment, elastic bushings are provided. In accordance with a variant of embodiment, cylindrical hinges, or universal joints, or acetabular joints are provided.

In accordance with one embodiment, said connecting elements 21L, 21R, 22L, 22R comprise a first left side connecting element 21L, a first right side connecting element 21R, a second left side connecting element 22L, a second right side connecting element 22R. Preferably, each of said left side connecting elements 21L, 22L is rotoidally coupled with said body 14 and rotoidally coupled with the left side connector 16L in a left side coupling site 41L, 42L, and each of said right side connection elements 21R, 22R is rotoidally coupled with said body 14 and rotoidally coupled with the right side junction device 16R in a right side coupling site 41L, 41R.

In accordance with a preferred embodiment, said first left side connecting element 21L, said left side junction device 16L, said second left side connecting element 22L and a portion of said body 14 form a left side articulated kinematic mechanism. Preferably, said articulated kinematic mechanism on the left side is an articulated quadrilateral. More preferably, said left side articulated kinematic mechanism is an articulated parallelogram. In accordance with a preferred embodiment, said first right side connecting element 21R, said right side junction device 16R, said second right side connecting element 22R and a portion of said body 14 form a right side articulated kinematic mechanism. Preferably, said right side articulated kinematic mechanism is an articulated quadrilateral. More preferably, said right side articulated kinematic mechanism is an articulated parallelogram.

In accordance with a preferred embodiment, said left side articulated kinematic mechanism and said right side articulated kinematic mechanism both comprise the same portion of said body 14. In accordance with one embodiment, said connecting elements 21L, 21R, 22L, 22R are rotoidally coupled to said body 14 in at least two body coupling sites 43, 45. Preferably, said two body coupling sites 43, 45 both belong to the median plane M-M of the tilting vehicle 100.

Said suspension assembly further comprises elasto-damper elements 24L, 24R associated with said junction devices 16L, 16R and suitable to damp elastically the stresses transmitted by said wheels 12L, 12R.

Advantageously, each junction device 16L, 16R comprises at least one dynamic joint portion 28L, 28R, rotoidally coupled to at least one elasto-damper element 24L, 24R in a dynamic joint coupling site 29L, 29R.

Providing such a junction device 16L, 16R allows the supporting structural action to be decoupled from the dynamic damping action. The articulated kinematic mechanism, preferably an articulated quadrilateral, more preferably an articulated parallelogram, identified by said connecting elements 21L, 22L, 21R, 22R, said body 14 and said junction devices 16L, 16R, transmits the action of structural continuity; e.g., it determines the rolling motion of the tilting vehicle, between the body 14 and the wheels of the tilting vehicle 100, while it is unable to elastically damp the impacts transmitted by the wheels of the tilting vehicle 100 to the body 14. At the same time, elasto-damper elements 24L, 24R are freed from structural tasks. Due to the decoupling between the supporting structural function and the dynamic action of elastic damping, said suspension assembly allows a non-elastic and non-damped roll.

As a further advantage, said junction device 16L, 16R rigidly determines the relative positioning and the spatial orientation of said first structural joint portion 31L, 31R, said second structural joint portion 32L, 32R and said dynamic joint portion 28L, 28R.

In accordance with a preferred embodiment, each junction device 16L, 16R comprises a steering joint portion 18L, 18R for the rotoidal connection to a hub bracket 20L, 20R associated with a wheel 12L, 12R of the tilting vehicle 100, so that said hub bracket 20L, 20R is free to rotate with respect to said junction device 16L, 16R around a steering axis L-L, R-R. In accordance with one embodiment, said steering joint portion 18L, 18R of said junction device 16L, 16R comprises a steering junction body which at least partially surrounds a steering joint cavity, suitable to house a steering fastening means, such as a steering pin, for coupling said hub bracket 20L, 20R to said junction device 16L, 16R. In a known manner, said wheels 12L, 12R are associated with at least one steering control 99 by means of a steering actuation system. Preferably, said hinge devices 16L, 16R are articulated to said body 12 by connecting elements 21L, 21R, 22L, 22R defining the directions of said steering axes L-L, R-R. In accordance with one embodiment, said junction devices 16L, 16R are articulated to said body 12 by means of connecting elements 21L, 21R, 22L, 22R defining the camber of the wheels 12L, 12R of the tilting vehicle 100, associable to the suspension assembly.

In accordance with one embodiment, said junction device 16L, 16R rigidly determines the relative positioning and spatial orientation of said first structural joint portion 31L, 31R, said second structural joint portion 32L, 32R, said dynamic joint portion 28L, 28R and said steering joint portion 18L, 18R.

Providing such a junction 16L, 16R allows the relative position and relative orientation of the elasto-damper elements 24L, 24R to be released from that of the steering axes L-L, R-R of the wheels 12L, 12R. This provides a further degree of freedom in defining the progressivity curves of the suspensions, which may be more easily optimized to ensure the homogeneity of response on the left and right sides of the tilting vehicle 100, even in the rolling condition and with high lean angles. The term "lean angle" means the angle formed by the median plane M-M of the tilting vehicle and the direction orthogonal to the surface of the road on which the tilting vehicle 100 is located.

By providing said dynamic joint portions 28L, 28R that allow a rotoidal coupling between said elasto-damper elements 24L, 24R and said junction devices 16L, 16R comprising said steering joint portions 18L, 18R, it is possible to decouple the dynamic damping action from the steering system of the tilting vehicle 100. Thus, when at least one wheel 12L, 12R of the tilting vehicle 100 strikes an obstacle, the stresses are not transmitted to the steering control 99. In other words, the steering control 99 is isolated from the impacts suffered by the wheels 12L, 12R, which are absorbed by said elasto-damper elements.

In accordance with one embodiment, a portion of said body 14 forms a side of both said right side and left side articulated kinematic mechanisms. Thus, a tilting movement of said body 14 causes a variation of the inclination of said junction devices 16L, 16R and consequently of said steering axes L-L, R-R.

In accordance with one embodiment, said junction device 16L, 16R is rigid. In accordance with one embodiment, said junction device is made of parts assembled and rigidly fixed together via fastening means.

In accordance with one embodiment, said junction device is made in one piece. In this way, the number of pieces to be manufactured to realize said suspension assembly is reduced.

In accordance with a preferred embodiment, said first connecting element 21L, 21R and said second connecting element 22L, 22R, said junction device 16L, 16R and a portion of said body 14 form an articulated kinematic mechanism. In accordance with a preferred embodiment, said first connecting element 21L, 21R and said second connecting element 22L, 22R, said junction device 16L, 16R and a portion of said body 14 form an articulated kinematic mechanism with parallel arms. In accordance with one embodiment, said first connecting element 21L, 21R and said second connecting element 22L, 22R, said junction device 16L, 16R and a portion of said body 14 form a kinematic mechanism with an articulated parallelogram. In this way, the steering axes L-L, R-R are oriented parallel to each other, even in rolling conditions.

In accordance with a preferred embodiment, said first connecting element 21L, 21R and said second connecting element 22L, 22R are rigid shafts. Providing an articulated quadrilateral kinematic mechanism without elastic elements as well as damping elements formed by said first connecting element 21L, 21R and said second connecting element 22L, 22R, said junction device 16L, 16R and a portion of said body 14, allows a predetermined inclination of the steering axis L-L, R-R to be kept constant.

In accordance with one embodiment, said first connecting elements 21L, 21R are suspension arms of a known type. In accordance with one embodiment, said second connecting elements 22L, 22R have a cross sectional area smaller than said first connecting elements 21L, 21R.

In accordance with one embodiment, said assembly comprises a rocker arm 26 associated in a tilting fashion to said body 14 in a horizontally pivoted manner, in particular in a rocker arm linkage site 47, and to said elasto-damper elements 24L, 24R.

In accordance with one embodiment, said rocker arm 26 comprises two plates secured to said body 14 by means of fixing elements, e.g. threaded elements. In accordance with one embodiment, said rocker arm 26 is made in one piece.

By providing said rocker arm 26, it is possible to make an articulated elasto-kinematic mechanism comprising said rocker arm 26, said elasto-damper elements 24L, 24R, said junction devices 16L, 16R and said first connecting elements 21L, 21R.

In accordance with a preferred embodiment, said assembly comprises a rocker arm 26 associated to said body 14 in a horizontally pivoted manner, and each of said elasto-damper elements 24L, 24R is eccentrically associated to said rocker arm 26 by means of at least one articulated arm 34L, 34R with respect to said rocker arm 26. Due to providing said arms 34L, 34R, said articulated elasto-kinematic mechanism comprises said rocker arm 26, said arms 34L, 34R, said elasto-damper elements 24L, 24R, said junction devices 16L, 16R and said first connecting elements 21L, 21R.

Through the installation of said arms 34L, 34R, it is possible to optimize the kinematic mechanism of the suspension assembly and reduce the need for the elasto-damper elements 24L, 24R to compress, even in the case of elevated lean angles. At the same time, it allows the footprint of the elasto-damper elements to be kept small in the direction transverse to the direction of travel; indeed, providing the arms 34L, 34R brings the elasto-damper elements 24L, 24R close to the median plane M-M of the vehicle, i.e. the center of the vehicle. This allows interference to be avoided between the movements of the elasto-damper elements 24L, 24R and the steering movements of the tilting vehicle, as well as the leaning or rolling movements of the suspension assembly. Therefore, by providing said arms 34L, 34R, articulated with respect to said rocker arm 26 and eccentrically associated with said rocker arm 26, during the roll of the tilting vehicle 100, the deformation of the elasto-damper elements 24L, 24R is avoided, allowing a non-damped rolling motion to be obtained. This provides improved stability to the tilting vehicle 100 under rolling conditions. Consequently, the tilting vehicle 100 has a greater lean angle in curves. Consequently, higher speeds of the tilting vehicle are permitted in curves, making said suspension assembly 100 suitable for applications on high performance tilting vehicles 100. In other words, said at least one elasto-damper element does not operate in rolling conditions. Providing elasto-damper elements 24L, 24R that do not operate during leaning or rolling allows an unresisted rolling movement to be achieved and increases the maneuverability of the tilting vehicle 100. Furthermore, by providing said arm 34L, 34R, articulated with respect to said rocker arm 26, in rolling conditions, one of said elasto-damper elements 24L, 24R is allowed to move relative to said rocker arm 26, preventing deformation.

Due to the decoupling of the supporting structural action provided by said articulated kinematic mechanism from the dynamic action of elasto-damping provided by said articulated elasto-kinematic mechanism, the flexural loads on the rocker arm 26 are reduced, allowing the rocker arm to be realized so as not to have high flexural stiffness. This effect occurs both with or without said articulated arms 34L, 34R, i.e. with or without an eccentric type association between the elasto-damper elements 24L, 24R and the rocker arm 26. Preferably, said rocker arm 26 is lighter with the same footprint compared with known solutions. In accordance with a preferred embodiment, said rocker arm 26 is made of sheet metal. In accordance with a preferred embodiment, said rocker arm element 26 comprises a box-shaped body which at least partially delimits a box-shaped body volume. Preferably, said box-shaped body volume is devoid of structural reinforcement elements. Preferably, said box-shaped body volume is comprised in the footprint of the box-shaped body.

Preferably, said rocker arm linking site 47 is aligned relative to said first body coupling site 43 and said second body coupling site 45. More preferably, said second body coupling site 45 is located between said first body coupling site 43 and said rocker arm linking site 47 along their junction. In accordance with one embodiment, the distance between said first body coupling site 43 and said second body coupling site 45 is less than the distance between said first body coupling site 43 and said rocker arm linking site 47.

In accordance with one embodiment, said elasto-damper element 24L, 24R has a longer longitudinal extension than said junction device 16L, 16R.

In accordance with a preferred embodiment, said arm 34L, 34R, articulated with respect to the rocker arm 26, is at least partially contained in said box-shaped body volume. In other words, at least a portion of said arm 34L, 34R, articulated with respect to the rocker arm 26, is contained within the footprint of said box-shaped body of said rocker arm 26.

In accordance with a preferred embodiment, said arm 34L, 34R, articulated with respect to said rocker arm 26, is rotoidally coupled to said elasto-damper element 24L, 24R in an arm coupling site 35L, 35R defining an arm coupling axis K-K oriented transversely relative to the direction of travel X-X of the tilting vehicle 100. Preferably, said arm coupling site 35L, 35R is a cylindrical hinge or elastic bushing. In this way, the arm orientation 34L, 34R is rigidly locked with respect to said rocker arm 26 in a plane transverse to the direction of travel X-X of the tilting vehicle 100.

Providing such arm coupling sites 35L, 35R allows said elasto-damper element 24L, 24R not to absorb the action of the direct loads parallel to the direction of travel X-X of the tilting vehicle 100, keeping the rocker arm 26 from being flexurally loaded by the action of such loads directed parallel to the direction of travel X-X. As a result, the rocker arm 26 may be sized to withstand only direct loads that are substantially vertical, and this allows for a simplified structure, e.g., one that may provide two simple perforated plates of metal, secured to each other by means of a structural element via threaded connections. This allows, without increasing the transverse dimension of the system, a suitable seat for the articulated arms 34L, 34R of the elasto-damper elements 24L, 24R to be obtained.

In accordance with one embodiment, said elasto-damper element 24L, 24R comprises a spring and a damper.

In accordance with one embodiment, said arms 34L, 34R are articulated at the end portions of said rocker arm 26, forming a cantilever connecting said elasto-damper elements 24L, 24R and bringing them closer to said body 14. In accordance with one embodiment, said arms 34L, 34R are articulated at end portions of said rocker arm 26, forming a cantilever which connects said elasto-damper elements 24L, 24R, bringing them closer to the median plane M-M of the tilting vehicle 100. The term "cantilever" is not intended to mean that said arms form a shelf element having a free end and an attachment root, but rather is intended to indicate that said arms carry an end of said elasto-damper elements 24L, 24R to said median axis M-M of the tilting vehicle 100.

In accordance with one embodiment, at least one of said arms 34L, 34R articulated with respect to said rocker arm 26, and said box-like body of said rocker arm element 26 is associated with additional masses, suitable to modify the mass of said rocker arm element 26 to influence the vibration modes of the suspension assembly 10. Indeed, by decoupling the supporting structural action from the dynamic action of elastic damping, the loads on the rocker arm are reduced, reducing the size of the solid bodies of the rocker arm, making it possible to incrementally associate additional masses with said rocker arm or said arm, by creating an adjustable or tunable dynamic damper. In this way, it is possible to size said arms 34L, 34R not with respect to the requirements of pure strength and stiffness, but in view of achieving an optimal mass value suitable to favorably affect the vibration modes of the wheels 12L, 12R. For example, about 5 kilograms may be added to each arm 34L, 34R of the tilting vehicle 100. For example, the ratio between the mass of the arm 34L, 34R and the associated non-suspended masses may be 1 to 1, or 1 to 2.

According to one embodiment, said first coupling site 41L, 41R and said second coupling site 42L, 42R are aligned to said steering axis L-L, R-R. In other words, said steering axis L-L, R-R, or an extension thereof, meets the first coupling site 41L, 41R and said second coupling site 42L, 42R. In accordance with one embodiment, said dynamic joint coupling site 29L, 29R is spaced at a predetermined distance from the joining line of said first coupling site 41L, 41R and said second coupling site 42L, 42R.

In accordance with one embodiment, said suspension assembly comprises a roll locking device 36 suitable to lock the relative orientation between said body 14 and said connecting elements 21L, 21R, 22L, 22R. In other words, said roll locking device 36 locks the articulated kinematic mechanism formed by said body 14, said junction device 16L, 16R and said connecting elements 21L, 21R, 22L, 22R. Preferably, said roll locking device 36 is actuated automatically when the tilting vehicle 100 advances at lower speeds than a threshold speed and/or is in a parked condition. For example, said roll locking device 36 comprises a disc brake device, or a rack and pinion device cooperating with a locking ratchet gear. Providing said roll locking device 36 allows the lateral fall of the tilting vehicle 100 in parked conditions to be avoided.

In accordance with one embodiment, said suspension assembly is symmetrical with respect to a median plane M-M passing through said body 14 when the lean angle of said tilting vehicle 100 is zero. In other words, said first left side connecting element 21L is of the same length as said first right side connecting element 21R and said second left side connecting element 22L is of the same length as said second right side connecting element 22R.

In accordance with a general embodiment, a forecarriage 11 is provided for a tilting vehicle 100. In accordance with one embodiment, said forecarriage 11 for a tilting vehicle 100 comprises at least one suspension assembly in accordance with any one of the embodiments previously described, at least two wheels 12L, 12R, at least two hub brackets 20L, 20R associated with said junction devices 16L, 16R, wherein each wheel 12L, 12R is associated with a hub bracket 20L, 20R.

Preferably, said wheels 12L, 12R are steering wheels and said forecarriage 11 is a steering forecarriage. In accordance with one embodiment, said forecarriage 11 for a tilting vehicle 100 comprises at least one suspension assembly in accordance with any one of the embodiments previously described and at least two wheels 12L, 12R associated with said junction devices 16L, 16R.

In accordance with one embodiment, said forecarriage 11 is a non-steering forecarriage.

In accordance with a preferred embodiment, said hub bracket 20L, 20R has a shape enclosing said steering junction portion 18L, 18R of said junction device 16L, 16R. In accordance with one embodiment, said hub bracket 20L, 20R has a substantially "C" shaped section enclosing said steering joint portion 18L, 18R of said junction device 16L, 16R. In this way, said hub bracket 20L, 20R may rotate around the steering axis L-L, R-R not to interfere with the elasto-damper elements 24L, 24R, while at the same time allowing said first coupling sites 41L, 41R of the first connecting elements 21L, 21R to be arranged in a position such as to allow satisfactory ground clearance to the tilting vehicle.

In accordance with one embodiment, each hub bracket 20L, 20R is associated integrally with at least one brake caliper 44L, 44R suitable to straddle a peripheral margin of an associable brake disc 46L, 46R. In accordance with one embodiment, each wheel 12L, 12R comprises a spoke 48L, 48R and a tire 49L, 49R.

In accordance with a general embodiment, a tilting vehicle 100 is provided, comprising a forecarriage 11 according to any one of the embodiments previously described.

In accordance with a preferred embodiment, said tilting vehicle 100 comprises three wheels.

In accordance with one embodiment, said tilting vehicle 100 comprises three wheels comprising two front wheels 12L, 12R and a rear drive wheel.

In accordance with a general embodiment, a rear axle for a tilting vehicle 100 is provided. Said rear axle of said tilting vehicle 100 comprises at least one suspension assembly in accordance with any one of the embodiments previously described and at least two wheels 12L, 12R, associated with said junction devices 16L, 16R. In accordance with one embodiment, said rear axle comprises at least two hub brackets 20L, 20R associated with said junction devices 16L, 16R and said at least two wheels 12L, 12R.

Due to the features described above, provided separately or jointly with each other, where applicable, in particular embodiments, it is possible to obtain a suspension assembly, as well as a forecarriage and a tilting vehicle, which simultaneously meet the conflicting needs described above, as well as the aforementioned desired advantages, and in particular:

- the transmission of the structural loads between suspended and non-suspended masses may be decoupled from the transmission of the dynamic loads to be damped;
- a non-damped rolling movement is achieved without thereby abandoning an elasto-damping action;
- the steering control of the tilting vehicle 100 may be isolated from the impacts suffered by the wheels 12L, 12R of the tilting vehicle 100;
- the elasto-damper elements 24L, 24R may be isolated from the direct impacts parallel to the direction of travel X-X of the tilting vehicle 100;
- the relative spatial orientation of the two wheels 12L, 12R may be locked;
- a undamped and unresisted rolling movement may be achieved, allowing for improved handling of the tilting vehicle 100.

To the embodiments described above, one skilled in the art may, to satisfy contingent and specific needs, make numerous modifications, adaptations and replacements of elements with others that are functionally equivalent, without however departing from the scope of the following claims.

REFERENCE LIST

L Indicates a component of the left side of the tilting vehicle
R Indicates a component of the right side of the tilting vehicle
11 Forecarriage
12 Wheel
14 Body of tilting vehicle
16 Junction device
18 Junction joint portion
20 Hub bracket
21 First connecting element 22 Second connecting element
24 Elasto-damper element
26 Rocker arm
28 Dynamic joint portions
29 Dynamic coupling site
31 First portion of structural joint
32 Second portion of structural joint
34 Arm, or articulated arm
35 Arm coupling site
36 Roll lock device
38 Road surface
41 First coupling site
42 Second coupling site
43 First body coupling site
44 Brake caliper
45 Second body coupling site
46 Brake disc
47 Rocker linkage site
48 Spoke
49 Tire
99 Steering control
100 Tilting vehicle
X-X Driving direction of the vehicle
L-L Left side steering axis
R-R Right side steering axis
K-K Arm axis of motion
M-M Median plane

The invention claimed is:

1. Suspension assembly for a forecarriage or a rear axle having at least two wheels of a tilting vehicle, comprising:
a body associable to the chassis of the tilting vehicle;
two junction devices opposite with respect to said body, each of said junction devices being associable to a wheel of the tilting vehicle;
said junction devices being joined to said body by means of connecting elements;
wherein each junction device comprises at least a first structural joint portion rotationally coupled in a first coupling site and at least a first connecting element, and at least a second structural joint portion rotationally coupled to a second coupling site and at least a second connecting element;
wherein said suspension assembly further comprises elasto-damper elements associated with said junction devices and suitable to damp the stresses transmitted by said wheels;
wherein each junction device comprises a dynamic joint portion, rotationally coupled to an elasto-damper element in a dynamic joint coupling site; and
wherein said junction device rigidly determines the relative positioning and the spatial orientation of said first structural joint portion, said second structural joint portion and said dynamic joint portion;
the suspension assembly further comprising a rocker arm associated in a tilting manner to said body and to said elasto-damper elements.

2. Suspension assembly according to claim 1, wherein each junction device comprises a steering joint portion for the cylindrical connection to a hub bracket associated with a wheel of the tilting vehicle, so that said hub bracket is free to rotate with respect to said junction device around a steering axis.

3. Suspension assembly according to claim 1, wherein each of said elasto-damper elements is eccentrically associated to said rocker arm by means of an arm articulated with respect to said rocker arm.

4. Suspension assembly according to claim 3, wherein said rocker arm comprises a box-shaped body that delimits at least partially a box-shaped body volume; and/or wherein a of said arms articulated with respect to said rocker arm and said box-like body of said rocker arm is associated with additional masses, suitable to modify the mass of said rocker arm to influence the vibration modes of the suspension assembly.

5. Suspension assembly according to claim 3, wherein said arm articulated with respect to said rocker arm is rotationally coupled to said elasto-damper element in an arm coupling site defining an arm coupling axis oriented transversely relative to the direction of travel of the tilting vehicle.

6. Suspension assembly according to claim 1, wherein said first connecting element and said second connecting element, said junction device and a portion of said body form an articulated quadrilateral kinematic mechanism.

7. Suspension assembly according to claim 1, wherein said first connecting element and said second connecting element are rigid shafts; and/or wherein said second connecting elements have cross-section areas smaller than that of said first connecting elements.

8. Suspension assembly according to claim 1, wherein said first coupling site and said second coupling site are aligned with a steering axis; and/or wherein said dynamic joint coupling site is spaced at a predetermined distance from the joining line of said first coupling site and said second coupling site.

9. Forecarriage for a tilting vehicle, comprising:
a suspension assembly according to claim 1,
two wheels,
wherein each wheel is associated with one of said junction devices; or wherein said forecarriage comprises:
a suspension assembly according to claim 1,
two wheels,
two hub brackets, each hub bracket being associated with one of said junction devices;
wherein each wheel is associated with a hub bracket.

10. Tilting vehicle comprising aa suspension assembly according to claim 1.

* * * * *